United States Patent
Kong

(10) Patent No.: US 11,792,865 B2
(45) Date of Patent: Oct. 17, 2023

(54) DEVICE BINDING METHOD AND APPARATUS, AND ELECTRONIC DEVICE

(71) Applicants: GD MIDEA AIR-CONDITIONING EQUIPMENT CO., LTD., Guangdong (CN); MIDEA GROUP CO., LTD., Guangdong (CN)

(72) Inventor: Shumiao Kong, Guangdong (CN)

(73) Assignees: GD MIDEA AIR-CONDITIONING EQUIPMENT CO., LTD., Guangdong (CN); MIDEA GROUP CO., LTD., Guangdong (CN)

(*) Notice: Subject to any disclaimer, the term of this patent is extended or adjusted under 35 U.S.C. 154(b) by 108 days.

(21) Appl. No.: 17/582,061

(22) Filed: Jan. 24, 2022

(65) Prior Publication Data

US 2022/0150990 A1 May 12, 2022

Related U.S. Application Data

(63) Continuation of application No. PCT/CN2019/113055, filed on Oct. 24, 2019.

(30) Foreign Application Priority Data

Jul. 30, 2019 (CN) .......................... 201910697391.X

(51) Int. Cl.
*G06F 15/16* (2006.01)
*H04W 76/10* (2018.01)
(Continued)

(52) U.S. Cl.
CPC .......... *H04W 76/10* (2018.02); *G06F 16/381* (2019.01); *H04W 12/06* (2013.01); *H04W 12/71* (2021.01); *H04W 84/12* (2013.01)

(58) Field of Classification Search
CPC ..... H04W 12/06; H04W 12/71; H04W 84/12; H04W 76/10; G06F 16/381
(Continued)

(56) References Cited

U.S. PATENT DOCUMENTS 9,009,805 B1* 4/2015 Kirkby ............... H04N 21/4622
709/224
9,600,726 B2* 3/2017 Kirkby .................. G06F 3/0485
(Continued)

FOREIGN PATENT DOCUMENTS

| CN | 104580265 A | 4/2015 |
|----|-------------|--------|
| CN | 104618440 A | 5/2015 |

(Continued)

OTHER PUBLICATIONS

Extended European Search report dated Aug. 1, 2022 received in European Patent Application No. EP 19940019.3.
(Continued)

*Primary Examiner* — Moustafa M Meky
(74) *Attorney, Agent, or Firm* — Scully, Scott, Murphy & Presser, P.C.

(57) ABSTRACT

The present disclosure provides a device binding method and apparatus, and an electronic device. The method includes: sending, by a first application program executing a first protocol, a query instruction to a target device, the query instruction being used to query a first device identifier of the target device in a second protocol; receiving, by the first application program, the first device identifier sent by the target device; and providing, by the first application program, the first device identifier, to enable a second application program executing the second protocol to bind a login account of the second application program to the target device based on the first device identifier.

19 Claims, 2 Drawing Sheets

(51) Int. Cl.
*G06F 16/38* (2019.01)
*H04W 12/71* (2021.01)
*H04W 12/06* (2021.01)
*H04W 84/12* (2009.01)

(58) Field of Classification Search
USPC .................................................... 709/228
See application file for complete search history.

(56) References Cited

U.S. PATENT DOCUMENTS

| | | | |
|---|---|---|---|
| 10,075,334 B1* | 9/2018 | Kozura | H04W 12/086 |
| 10,262,210 B2* | 4/2019 | Kirkby | G06V 20/40 |
| 10,586,112 B2* | 3/2020 | Kirkby | G06F 3/04842 |
| 10,764,128 B2* | 9/2020 | Kozura | H04W 12/069 |
| 10,789,957 B1* | 9/2020 | Tiwari | H04L 67/125 |
| 10,896,585 B2* | 1/2021 | Kirkby | G06F 3/04847 |
| 11,256,951 B2* | 2/2022 | Bapat | G08B 13/1966 |
| 11,483,451 B2* | 10/2022 | Heitz, III | H04N 23/11 |
| 2008/0123843 A1 | 5/2008 | Machani | |
| 2016/0094994 A1* | 3/2016 | Kirkby | G11B 27/031 380/270 |
| 2017/0195313 A1* | 7/2017 | Kirkby | H04N 7/18 |
| 2018/0159740 A1 | 6/2018 | Knechtel et al. | |
| 2019/0028338 A1* | 1/2019 | Kozura | H04W 12/069 |

FOREIGN PATENT DOCUMENTS

| | | |
|---|---|---|
| CN | 104967596 A | 10/2015 |
| CN | 105245614 A | 1/2016 |
| CN | 105554735 A | 5/2016 |
| CN | 105634889 A | 6/2016 |
| CN | 106936676 A | 7/2017 |
| CN | 107154946 A | 9/2017 |
| CN | 107944853 A | 4/2018 |
| CN | 107995215 A | 5/2018 |
| CN | 108135022 A | 6/2018 |
| CN | 109361535 A | 2/2019 |
| CN | 109510796 A | 3/2019 |
| CN | 109587016 A | 4/2019 |
| CN | 110365704 A | 10/2019 |
| KR | 10-2016-0064797 A | 6/2016 |
| WO | 2018125053 A1 | 7/2018 |
| WO | 2019/062687 A1 | 4/2019 |

OTHER PUBLICATIONS

International Search report dated Apr. 20, 2020 received in International Application No. PCT/CN2019/113055 together with an English language translation.
First Office Action dated Mar. 4, 2020 received in Chinese Patent Application No. CN 201910697391.X together with an English language translation.
Second Office Action dated Jul. 21, 2020 received in Chinese Patent Application No. CN 201910697391.X together with an English language translation.
Notification to Grant Patent Right for Invention dated Dec. 21, 2020 received in Chinese Patent Application No. CN 201910697391.X together with an English language translation.
Jin, X., "Research on the Interaction Between Intelligent Device and Mobile Binding Process", Nov. 8, 2017, pp. 122-124 together with an English language abstract.
Yawen, G., "The Design and Development of General Smart Home System Based on MQTT", Mar. 15, 2016, pp. 1-73, together with an English language abstract.

* cited by examiner

DEVICE BINDING METHOD AND APPARATUS, AND ELECTRONIC DEVICE

CROSS REFERENCE TO RELATED APPLICATION

The present application is a continuation application of PCT International Application No. PCT/CN2019/113055, which claims priority to and benefits of Chinese Patent Application No. 201910697391.X, titled "DEVICE BINDING METHOD AND APPARATUS, AND ELECTRONIC DEVICE", filed on Jul. 30, 2019, the entire contents of which are incorporated herein by reference for all purposes. No new matter has been introduced.

TECHNICAL FIELD

The present disclosure relates to the technical field of smart home appliances, and more particularly, to a device binding method and apparatus, and an electronic device.

BACKGROUND

The Apple HomeKit ecosystem is a smart home platform released by Apple Inc. Home appliances that join the HomeKit ecosystem can be controlled intelligently via Apple's smart terminals, such as mobile phones, iPads, and the like, thereby increasing the diversity and flexibility of smart home appliances control.

For an appliance to join the Apple HomeKit ecosystem, it is needed to enter a corresponding setup code or scan a QR code. For Apple Inc.'s information and ecosystem security, setup codes or QR codes of appliances that comply with the HomeKit protocol are unique, i.e., different codes are for different appliances. Once the setup code or QR code is lost, or an erroneous setup code is provided negligently during the production process of the appliance, a consumer cannot join the HomeKit ecosystem and would require a door-to-door service of an engineer. The after-sales cost is thus relatively high, resulting in a high complaint rate.

SUMMARY

The present disclosure aims to solve at least one of the technical problems in the related art at least to a certain extent.

To this end, a first object of the present disclosure is to provide a device binding method. When a first device identifier in a second protocol is lost or erroneous, a first application program executing a first protocol can query a target device for the first device identifier, such that a second application program can bind a login account to the target device based on a re-obtained first device identifier. In this way, the after-sales complaint rate and after-sales cost can be reduced, and the convenience can be improved. The technical problem in the related art associated with the high after-sale complaint rate and cost when the first device identifier is lost or erroneous, which would require door-to-door service of after-sales personnel, can be solved.

A second object of the present disclosure is to provide a device binding apparatus.

A third object of the present disclosure is to provide an electronic device.

A fourth object of the present disclosure is to provide a computer-readable storage medium.

To achieve the above objects, in a first aspect, an embodiment of the present disclosure provides a device binding method, which is a computer-implemented method. The method includes: sending, by a first application program executing a first protocol, a query instruction to a target device, the query instruction being used to query a first device identifier of the target device in a second protocol; receiving, by the first application program, the first device identifier sent by the target device; and providing, by the first application program, the first device identifier, to enable a second application program executing the second protocol to bind a login account of the second application program to the target device based on the first device identifier.

In order to achieve the above objects, in a second aspect, an embodiment of the present disclosure provides a device binding apparatus. The apparatus hosts a first application program executing a first protocol. The apparatus includes: a query module configured to send a query instruction to a target device, the query instruction being used to query a first device identifier of the target device in a second protocol; a receiving module configured to receive the first device identifier sent by the target device; and a binding module configured to provide the first device identifier, to enable a second application program executing the second protocol to bind a login account of the second application program to the target device based on the first device identifier. The functional modules can be implemented by one or more computers or processors.

To achieve the above objects, in a third aspect, an embodiment of the present disclosure provides an electronic device. The electronic device hosts a first application program executing a first protocol and a second application program executing a second protocol. The electronic device includes a memory, a processor, and a computer program stored in or embodied with the memory and executable by the processor. The processor is a hardware processor coupled with the memory and is configured to implement, when executing the program, the device binding method according to the first aspect.

To achieve the above objects, in a fourth aspect, an embodiment of the present disclosure provides a computer-readable storage medium. The computer-readable storage medium has a computer program stored therein or embodied therewith. The program, when executed by a processor, implements the device binding method in the first aspect.

The technical solutions according to the embodiments of the present disclosure may include the following advantageous effects.

The first application program executing the first protocol sends the query instruction to the target device. The query instruction is used to query the first device identifier of the target device in the second protocol. The first application program receives the first device identifier sent by the target device. The first application program provides the first device identifier, to enable the second application program executing the second protocol to bind the login account of the second application program to the target device based on the first device identifier. When the first device identifier in the second protocol is lost or erroneous, the first application program executing the first protocol can query the target device for the first device identifier, such that the second application program can bind the login account to the target device based on the re-obtained first device identifier. In this way, the after-sales complaint rate and after-sales cost can be reduced, and the operational convenience can be improved.

Additional aspects and advantages of the embodiments of the present disclosure will be given in part in the following description, or become apparent in part from the following description, or can be learned from practices of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
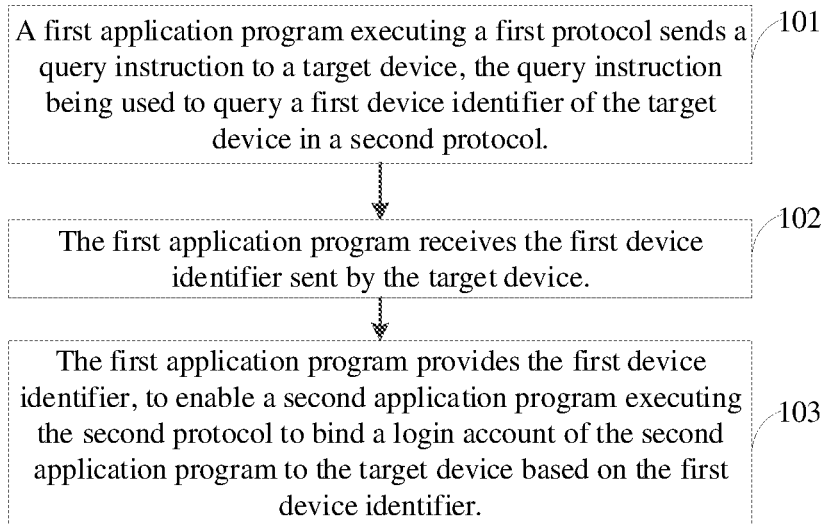
FIG. 1 is a schematic flowchart illustrating a device binding method according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the following, a device binding method and apparatus, and an electronic device according to the embodiments of the present disclosure will be described with reference to the accompanying drawings.

FIG. 1 is a schematic flowchart illustrating a device binding method according to an embodiment of the present disclosure.

As shown in FIG. 1, the method includes the following steps.

At step 101, a first application program executing a first protocol sends a query instruction to a target device. The query instruction is used to query a first device identifier of the target device in a second protocol.

Here, the first application program refers to an application program installed in an electronic device. The electronic device, for example, can be an electronic device in which application programs can be installed, such as a smart phone, an iPad, a smart wearable device, a palmtop, etc., and the embodiment is not limited to any of these examples. The target device may be a smart home appliance, including but not limited to an air conditioner, a washing machine, a refrigerator, a microwave oven, etc., and the embodiment is not limited to any of these examples. Since more than one application can be installed in the electronic device, different installed applications can execute different protocols, and the different applications can control home appliance based on the protocols corresponding to the applications. For ease of distinguishing, an application program executing the first protocol is referred to as the first application program, and an application program executing a second protocol is referred to as a second application program. The first protocol and the second protocol are two different protocols. The first protocol is an open smart home protocol. A corresponding device identifier in the first protocol is in plain text. For ease of distinguishing, the corresponding device identifier in the first protocol is referred to as a second device identifier. For example, the first protocol may be the M-smart protocol executed by Midea Co.'s application program for smart home appliances control, i.e., MEIJU application program. The second device identifier of the target device in the M-smart protocol can be obtained in plain text, which means that when the first application program executing the first protocol is bound to the home appliance, the second device identifier to be used for binding verification can be obtained directly. The second protocol may be the HomeKit protocol executed by Apple Inc.'s Home application program. Once the first device identifier of the target device in the second protocol is lost (e.g., the first device identifier may be a setup code), when the target device is bound using the second application program, the first device identifier cannot be directly obtained and needs to be read from a storage unit of the target device, that is, the target device cannot be bound directly.

Furthermore, when the first device identifier is lost or the first device identifier is erroneous, since the first application program can send the query instruction to the target device in response to the query request triggered by the user in the first application program installed on the electronic device, the target device can query and obtain the first device identifier of the target device in the second protocol based on the query instruction.

At step 102, the first application program receives the first device identifier sent by the target device.

As a possible implementation, the first application program can receive the first device identifier sent by the target device using a near field communication technology. Here, the near field communication technology may be, for example, Wireless Fidelity (WiFi) communication technology, Bluetooth technology, infrared technology, or Near Field Communication (NFC) technology, and the embodiment is not limited to any of these examples.

As another possible implementation, the target device can find the first device identifier in accordance with the query instruction, and send the first device identifier to a background server, which can subsequently send the first device identifier to the electronic device bound to the target device, such that the first application program installed in the electronic device can obtain the first device identifier.

At step 103, the first application program provides the first device identifier, to enable a second application program executing the second protocol to bind a login account of the second application program to the target device based on the first device identifier.

As a possible implementation, after the first application program obtains the first device identifier, the first device identifier can be displayed on an interactive interface of the first application program, such that the user can obtain the first device identifier. In the opened second application program, based on the obtained first device identifier, the second application program can bind the login account of the second application program to the target device on a binding interface, such that the second application program can control the target device. For example, the electronic device having the second application program installed can control from a bedroom a washing machine on a balcony to wash clothes, or a curtain on the balcony to close or open.

As another possible implementation, after the first application program obtains the first device identifier, the first application program can invoke the second application program to start the second application program, and the first application program can send the first device identifier to the second application program, such that the second application program can bind the login account of the second application program to the target device based on the obtained first device identifier.

In the embodiment of the present disclosure, the first application program can send the query instruction to the target device to obtain the first device identifier of the target device in the second protocol from the target device, which allows updating the first device identifier and obtaining an updated first device identifier without the need for a door-to-door service of after-sales personnel, thereby reducing the complaint rate and saving the cost of the door-to-door service of the after-sales personnel.

In the device binding method according to this embodiment, the first application program executing the first protocol sends the query instruction to the target device. The query instruction is used to query the first device identifier of the target device in the second protocol. The first application program receives the first device identifier sent by the target device. The first application program provides the first device identifier, to enable the second application program executing the second protocol to bind the login account of the second application program to the target device based on the first device identifier. When the first device identifier in the second protocol is lost or erroneous, the first application program executing the first protocol can query the target device for the first device identifier. In this way, the door-to-door service of after-sales personnel can be avoided, the after-sales complaint rate and after-sales cost can be reduced, and the convenience can be improved.

Figure 2:
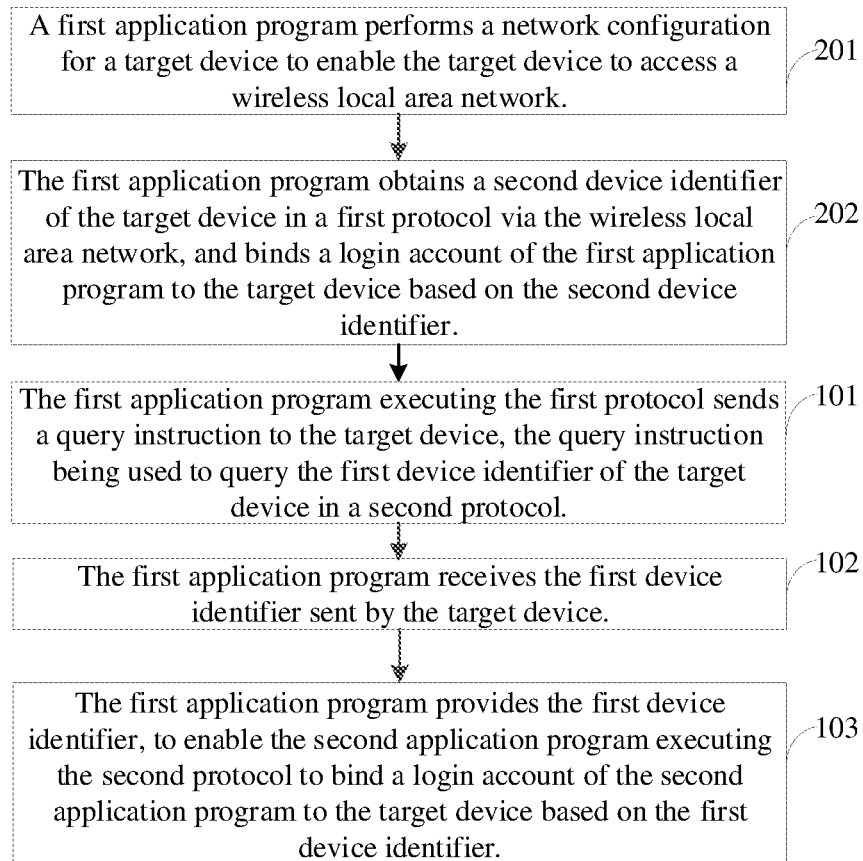
FIG. 2 is a schematic flowchart illustrating another device binding method according to an embodiment of the present disclosure.

In order to enhance the description of the previous embodiment, a device binding method according to another embodiment is provided. FIG. 2 is a schematic flowchart illustrating this device binding method.

As shown in FIG. 2, prior to step 101, the method may include the following steps.

At step 201, the first application program performs a network configuration for the target device to enable the target device to access a wireless local area network.

For example, the first application program installed in the electronic device can access the target device via a hotspot initiated by the target device to send the target device access information for the target device to access the wireless local area network. As a possible implementation, the target device is used as a hotspot, and a TCP or UDP communication connection can be established between the electronic device and the target device, such that the first application program in the electronic device can send an SSID and a password of a wireless router of the wireless local area network, which the target device is to access, to the target device via the TCP or UDP communication connection. Thus, the target device can access the wireless local area network based on information on the SSID and the password.

At step 202, the first application program obtains a second device identifier of the target device in the first protocol via the wireless local area network, and binds a login account of the first application program to the target device based on the second device identifier.

For example, after the target device has accessed the wireless local area network, the first application program can add the target device in the first protocol, and the target device can directly obtain the second device identifier. As a possible implementation, on a device-adding interface of the first application program, when the user enters a unique device identification code of the target device to be added, the second device identifier can be directly displayed on the adding interface, for example, a password 123456 in plain text. Further, based on the second device identifier, the first application program can bind the login account of the first application program to the target device, such that the first application program can control the target device, so that the first application program can read the first device identifier of the second application program in the second protocol from the target device, e.g., read the first device identifier of the target device in the second protocol from a WiFi module.

It is to be noted that, after the first device identifier is lost or erroneous, the second application program executing the second protocol cannot obtain the first device identifier directly, and the login account of the second application program cannot be bound to the target device. Before the login account of the second application program can be bound to the target device, the target device cannot be accessed by the second application program, which means that the second application program cannot send a query instruction to the target device to update the first device identifier directly. Therefore, in this embodiment, when the first application program executing the first protocol is being bound to the target device, the second device identifier required for such binding can be directly obtained in plain text. Accordingly, the first application program can be bound to the target device, such that the first application program can access the target device to obtain the first device identifier of the target device in the second protocol after the binding is completed, without the need for the user to wait for the door-to-door service of after-sales personnel and the need for the after-sales personnel to use specific software to connect to the target device to obtain the first device identifier from the target device. In this way, the binding efficiency can be improved, the complaint rate can be reduced, the cost can be saved, and the user satisfaction can be enhanced.

In the device binding method according to this embodiment, when the first application program executing the first protocol is being bound to the target device, the second device identifier required for such binding can be directly obtained in plain text. Accordingly, the first application program can be bound to the target device, so as to access the target device to obtain the first device identifier of the target device in the second protocol, without the need for the user to wait for the door-to-door service of after-sales personnel when first device identifier of the target device in the second protocol is lost or erroneous. In this way, the binding efficiency can be improved, the complaint rate can be reduced, the cost can be saved, and the user satisfaction can be enhanced.

In order to implement the above embodiments, the present disclosure also provides a device binding apparatus. The apparatus hosts a first application program executing a first protocol.

Figure 3:
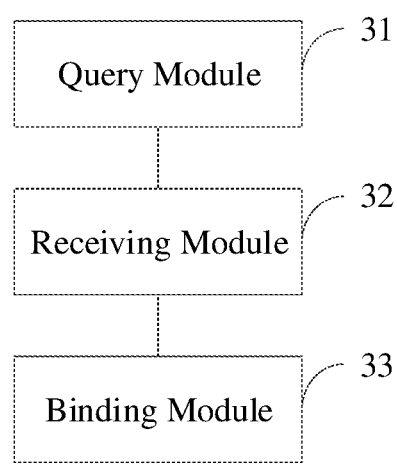
FIG. 3 is a schematic diagram showing a structure of a device binding apparatus according to an embodiment of the present disclosure.

FIG. 3 is a schematic diagram showing a functional configuration of a device binding apparatus according to an embodiment of the present disclosure.

As shown in FIG. 3, the apparatus includes: a query module 31, a receiving module 32, and a binding module 33. The functional modules can be implemented by one or more computers or processors.

The query module 31 is configured to send a query instruction to a target device. The query instruction is used to query a first device identifier of the target device in a second protocol.

The receiving module 32 is configured to receive the first device identifier sent by the target device.

The binding module 33 is configured to provide the first device identifier, to enable a second application program executing the second protocol to bind a login account of the second application program to the target device based on the first device identifier.

Further, in a possible implementation of the embodiment of the present disclosure, the apparatus may further include a network configuration module.

As a possible implementation, the network configuration module can be configured to perform a network configuration for the target device to enable the target device to access a wireless local area network.

As another possible implementation, the network configuration module can be configured to: access, by the first application program, the target device via a hotspot initiated by the target device, to send access information to the target device. The access information is used for the target device to access the wireless local area network.

Thus, in an example, the above binding module 33 can be configured to: obtain, by the first application program, a second device identifier of the target device in the first protocol via the wireless local area network; and bind, by the first application program, a login account of the first application program to the target device based on the second device identifier.

As a possible implementation, the above binding module 33 can be configured to display the first device identifier.

As another possible implementation, the above binding module 33 can be further configured to invoke the second application program to start the second application program; and send the first device identifier to the second application program.

It is to be noted that the above description of the embodiment of the device binding method is also applicable to the device binding apparatus in this embodiment, as the same principle is shared, and details thereof will be omitted here.

In the device binding apparatus according to this embodiment, the first application program executing the first protocol sends the query instruction to the target device. The query instruction is used to query the first device identifier of the target device in the second protocol. The first application program receives the first device identifier sent by the target device. The first application program provides the first device identifier, to enable the second application program executing the second protocol to bind the login account of the second application program to the target device based on the first device identifier. When the first device identifier in the second protocol is lost or erroneous, the first application program executing the first protocol can query the target device for the first device identifier, such that the second application program can bind the login account to the target device based on the re-obtained first device identifier. In this way, the after-sales complaint rate and after-sales cost can be reduced, and the convenience can be improved.

In order to implement the above embodiments, the present disclosure further provides an electronic device. The electronic device hosts a first application program executing a first protocol and a second application program executing a second protocol. The electronic device includes a memory, a processor and a computer program stored in the memory and executable on the processor. The processor is coupled with the memory and configured to implement, when executing the program, the device binding method according to the above method embodiments.

In order to implement the above embodiments, the present disclosure provides a computer-readable storage medium having a computer program stored thereon. The program, when executed by a processor, implements the device binding method according to the above embodiments.

In the present disclosure, the description with reference to the terms "an embodiment", "some embodiments", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative description of the above terms does not necessarily refer to the same embodiment(s) or example(s). Moreover, the specific features, structures, materials or characteristics as described can be combined in any one or more embodiments or examples as appropriate. In addition, those skilled in the art can combine or integrate different embodiments or examples, or features thereof, as described in the present disclosure given that they do not contradict each other.

In addition, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Any process or method described in the flowchart or described otherwise herein can be understood as a module, segment or part of codes that include one or more executable instructions for implementing steps of specific logical functions or processes. It can be appreciated by those skilled in the art that the scope of the preferred embodiments of the present disclosure includes additional implementations where functions may not be performed in the order as shown or discussed, including implementations where the involved functions are performed substantially in parallel or even in a reverse order.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can retrieve and execute instructions from an instruction execution system, apparatus, or device). For the specification, a "computer-readable medium" can be any apparatus that can contain, store, communicate, propagate, or transmit a program to be used by or used with an instruction execution system, apparatus, or device. More specific examples of computer-readable mediums include, as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then stored in a computer memory.

It can be appreciated that each part of the present disclosure can be implemented in hardware, software, firmware or any combination thereof. In the above embodiments, a plurality of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

It can be appreciated by those skilled in the art that all or some of the steps in the methods of the above embodiments can be implemented by relevant hardware following instructions of a program. The program can be stored in a computer-readable storage medium, and the program, when executed, implements any one or combination of the steps of the method embodiments.

In addition, the functional units in various embodiments of the present disclosure may be integrated into one processing module, or each unit may be standalone physically, or two or more units may be integrated into one module. The above integrated module can be implemented in a form of hardware or in a form of a software function module. When implemented in the form of the software function module and sold or used as an independent product, the integrated module can also be stored in a computer-readable storage medium.

The storage medium mentioned above may be a read only memory, a magnetic disk or an optical disc, etc. Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A device binding method comprising:
   sending, by a first application program executing a first protocol, a query instruction to a target device, the query instruction being used to query a first device identifier of the target device in a second protocol;
   receiving, by the first application program, the first device identifier sent by the target device; and
   providing, by the first application program, the first device identifier, to enable a second application program executing the second protocol to bind a login account of the second application program to the target device based on the first device identifier.

2. The device binding method according to claim 1, further comprising: prior to the sending the query instruction to the target device,
   performing, by the first application program, a network configuration for the target device to enable the target device to access a wireless local area network.

3. The device binding method according to claim 2, wherein said performing, by the first application program, the network configuration for the target device comprises:
   accessing, by the first application program, the target device via a hotspot initiated by the target device, to send access information to the target device,
   wherein the access information is used for the target device to access the wireless local area network.

4. The device binding method according to claim 2, further comprising: subsequent to the first application program performing the network configuration for the target device to enable the target device to access the wireless local area network,
   obtaining, by the first application program, a second device identifier of the target device in the first protocol via the wireless local area network; and
   binding, by the first application program, a login account of the first application program to the target device based on the second device identifier.

5. The device binding method according to claim 1, wherein said providing, by the first application program, the first device identifier comprises:
   displaying, by the first application program, the first device identifier.

6. The device binding method according to claim 1, wherein said providing, by the first application program, the first device identifier comprises:
   invoking, by the first application program, the second application program to start the second application program; and
   sending, by the first application program, the first device identifier to the second application program.

7. A device binding apparatus, hosting a first application program executing a first protocol, the device binding apparatus comprising:
   a hardware processor; and
   a memory coupled with the hardware processor, a computer program being stored in the memory and executable by the processor,
   wherein the hardware processor, when executing the computer program, is configured to at least:
   send a query instruction to a target device, the query instruction being used to query a first device identifier of the target device in a second protocol;
   receive the first device identifier sent by the target device; and
   provide the first device identifier, to enable a second application program executing the second protocol to bind a login account of the second application program to the target device based on the first device identifier.

8. The device binding apparatus according to claim 7, wherein the hardware processor is further configured to:
   perform a network configuration for the target device to enable the target device to access a wireless local area network.

9. The device binding apparatus according to claim 8, wherein the hardware processor is further configured to:
   access the target device via a hotspot initiated by the target device, to send access information to the target device,
   wherein the access information is used for the target device to access the wireless local area network.

10. The device binding apparatus according to claim 8, wherein the hardware processor is further configured to:
    obtain a second device identifier of the target device in the first protocol via the wireless local area network; and
    bind a login account of the first application program to the target device based on the second device identifier.

11. The device binding apparatus according to claim 7, wherein the hardware processor is further configured to:
    display the first device identifier.

12. The device binding apparatus according to claim 7, wherein the hardware processor is further configured to:
    invoke the second application program to start the second application program; and
    send the first device identifier to the second application program.

13. An electronic device, hosting a first application program executing a first protocol and a second application program executing a second protocol, the electronic device comprising:
- a hardware processor; and
- a memory coupled with the hardware processor, a computer program being stored in the memory and executable by the hardware processor,
- wherein the hardware processor, when executing the computer program, is configured to at least:
- send, by the first application program, a query instruction to a target device, the query instruction being used to query a first device identifier of the target device in the second protocol;
- receive, by the first application program, the first device identifier sent by the target device; and
- provide, by the first application program, the first device identifier, to enable the second application program executing the second protocol to bind a login account of the second application program to the target device based on the first device identifier.

14. The electronic device according to claim 13, wherein the hardware processor is further configured to:
- perform a network configuration for the target device to enable the target device to access a wireless local area network.

15. The electronic device according to claim 14, wherein the hardware processor is further configured to:
- access the target device via a hotspot initiated by the target device, to send access information to the target device,
- wherein the access information is used for the target device to access the wireless local area network.

16. The electronic device according to claim 14, wherein the hardware processor is further configured to:
- obtain a second device identifier of the target device in the first protocol via the wireless local area network; and
- bind a login account of the first application program to the target device based on the second device identifier.

17. The electronic device according to claim 13, wherein the hardware processor is further configured to:
- display the first device identifier.

18. The electronic device according to claim 13, wherein the hardware processor is further configured to:
- invoke the second application program to start the second application program; and
- send the first device identifier to the second application program.

19. A computer-readable storage medium having a computer program stored thereon, the computer program, when executed by a processor, implementing the device binding method according to claim 1.

* * * * *